(12) United States Patent
Kim

(10) Patent No.: US 7,936,378 B2
(45) Date of Patent: May 3, 2011

(54) IMAGE PICKUP DEVICE AND ENCODED DATA TRANSFERRING METHOD

(75) Inventor: Do-Hyung Kim, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 333 days.

(21) Appl. No.: 12/092,400

(22) PCT Filed: Oct. 31, 2006

(86) PCT No.: PCT/KR2006/004471
§ 371 (c)(1),
(2), (4) Date: Sep. 17, 2008

(87) PCT Pub. No.: WO2007/052932
PCT Pub. Date: May 10, 2007

(65) Prior Publication Data
US 2009/0079843 A1    Mar. 26, 2009

(30) Foreign Application Priority Data

Nov. 2, 2005 (KR) .......................... 10-2005-0104604

(51) Int. Cl.
*H04N 5/228* (2006.01)
(52) U.S. Cl. ................ 348/222.1; 348/207.1; 348/231.1; 348/220.1
(58) Field of Classification Search ........... 348/222.1, 348/207.1, 231.1, 220.1; 710/72, 73; 386/5, 386/109, 110
See application file for complete search history.

(56) References Cited

U.S. PATENT DOCUMENTS

| 5,111,490 A * | 5/1992 | Drawert ........................ 378/4 |
| 2002/0196351 A1 | 12/2002 | Noguchi |

FOREIGN PATENT DOCUMENTS

KR    10-2002-0052218 A    7/2002

* cited by examiner

*Primary Examiner* — Yogesh K Aggarwal
(74) *Attorney, Agent, or Firm* — Birch, Stewart, Kolasch & Birch, LLP

(57) ABSTRACT

A method of transferring encoded data and an imaging device executing the method thereof are disclosed. The image signal processor according to an embodiment of the present invention has an encoding unit, which generates encoded image data by encoding, in accordance with a predetermined encoding method, image data corresponding to an electrical signal inputted from an image sensor, and a data output unit, which temporarily stores the image data encoded by the encoding unit and transfers the stored encoded image data to a receiving part. The data output unit can input a skip command, which makes the process of a following frame skip, to the image sensor or the encoding unit in case input start information of the following frame is inputted from the image sensor or the encoding unit while a preceding frame is processed by the encoding unit, the skip command. Therefore, it becomes possible to increase the process efficiency of the back-end chip and to reduce the power consumption.

15 Claims, 6 Drawing Sheets

IMAGE PICKUP DEVICE AND ENCODED DATA TRANSFERRING METHOD

CROSS-REFERENCE TO RELATED APPLICATIONS

This application claims foreign priority benefits under 35 U.S.C. .sctn. 119(a)-(d) to PCT/KR2006/004471, filed Oct. 31, 2006, which is hereby incorporated by reference in its entirety.

BACKGROUND

1. Technical Field

The present invention is related to data encoding, more specifically to data encoding executed in an imaging device.

2. Description of the Related Art

By mounting a small or thin imaging device on a small or thin portable terminal, such as a portable phone or a PDA (personal digital assistant), the portable terminal can now function as an imaging device also. Thanks to this new development, the portable terminal, such as the portable phone, can send not only audio information but also visual information. The imaging device has been also mounted on a portable terminal such as the MP3 player, besides the portable phone and PDA. As a result, a variety of portable terminals can now function as an imaging device, capturing an external image and retaining the image as electronic data.

Generally, the imaging device uses a solid state imaging device such as a CCD (charge-couple device) image sensor or a CMOS (complementary metal-oxide semiconductor) image sensor.

FIG. 1 is a simplified structure of a typical imaging device, and FIG. 2 shows the steps of a typical JPEG encoding process. FIG. 3 shows signal types of a related image signal processor (ISP) for outputting encoded data.

As shown in FIG. 1, the imaging device, converting the captured external image to electronic data and displaying the image on a display unit 150, comprises an image sensor 110, an image signal processor (ISP) 120, a back-end chip 130, a baseband chip 140 and a display unit 150. The imaging device can further comprise a memory, for storing the converted electronic data, and an AD converter, converting an analog signal to a digital signal.

The image sensor 110 has a Bayer pattern and outputs an electrical signal, corresponding to the amount of light inputted through a lens, per unit pixel.

The image signal processor 120 converts raw data inputted from the image sensor 110 to a YUV value and outputs the converted YUV value to the back-end chip. Based on the fact that the human eye reacts more sensitively to luminance than to chrominance, the YUV method divides a color into a Y component, which is luminance, and U and V components, which are chrominance. Since the Y component is more sensitive to errors, more bits are coded in the Y component than in the U and V components. A typical Y:U:V ratio is 4:2:2.

By sequentially storing the converted YUV value in FIFO, the image signal processor 120 allows the back-end chip 130 to receive corresponding information.

The back-end chip 130 converts the inputted YUV value to JPEG or BMP through a predetermined encoding method and stores the YUV value in a memory, or decodes the encoded image, stored in the memory, to display on the display unit 150. The back-end chip 130 can also enlarge, reduce or rotate the image. Of course, it is possible, as shown in FIG. 1, that the baseband chip 140 can also receive from the back-end chip 130, and display on the display unit 150, the decoded data.

The baseband chip 140 controls the general operation of the imaging device. For example, once a command to capture an image is received from a user through a key input unit (not shown), the baseband chip 140 can make the back-end chip 130 generate encoded data corresponding to the inputted external image by sending an image generation command to the back-end chip 130.

The display unit 150 displays the decoded data, provided by the control of the back-end chip 130 or the baseband chip 140.

FIG. 2 illustrates the steps of typical JPEG encoding, carried out by the back-end chip 130. Since the JPEG encoding process 200 is well-known to those of ordinary skill in the art only a brief description will be provided here.

As illustrated in FIG. 2, the image of the inputted YUV values is divided into a block in the size of 8×8 pixels, and in a step represented by 210, DCT (discrete cosine transform) is performed for each block. The pixel value, which is inputted as an 8-bit integer of between −129 and 127, is transformed to a value between −1024 and 1023 by DCT.

Then, in a step represented by 220, a quantizer quantizes a DCT coefficient of each block by applying a weighted value according to the effect on the visual. A table of this weighted value is called a "quantization table." A quantization table value takes a small value near the DC and a high value at a high frequency, keeping the data loss low near the DC and compressing more data at a high frequency.

Then, in a step represented by 230, the final compressed data is generated by an entropy encoder, which is a lossless coder.

The data encoded through the above steps is stored in a memory. The back-end chip decodes the data loaded in the memory and displays the data on the display unit 150.

Signal types during the steps of sequentially inputting the data, stored in the memory, to process, for example, decoding are shown in FIG. 3. Generally, the back-end chip 130 is realized to receive the YUV/Bayer-format data, and the P_CLK, V_sync, H_fREF and DATA signals are used as the interface for receiving this kind of data.

As shown in FIG. 3, the conventional back-end chip 130 maintains the output state of the clock signal (P_CLK) to an "On" state throughout the process of transferring the encoded data to a following element (e.g. a decoding unit), and thus the back-end chip 130 has to carry out an operation for interfacing with the following element while invalid data (e.g. data including 0x00) is inputted.

As a result, the back-end chip 130 of the conventional imaging device consumed unnecessary electric power by carrying out an unnecessary operation.

Moreover, as shown in FIG. 3, the conventional image signal processor 120 may output a new vertical synchronous signal (V_sync2) to the back-end chip 130 although the encoding process on the frame that is currently being processed is not completed.

In this case, the back-end chip 130 sometimes processes not only the frame that is currently being processed but also the next frame, not completing the input and/or process of correct data.

SUMMARY

In order to solve the problems described above, the present invention provides a method of transferring encoded data and an imaging device executing the method thereof that can increase the process efficiency and reduce power consumption of the back-end chip.

The present invention also provides a method of transferring encoded data and an imaging device executing the method thereof that can make the hardware design and control easier by using a general interface structure when the image signal processor provides encoded data to the back-end chip.

The present invention also provides a method of transferring encoded data and an imaging device executing the method thereof that can perform a smooth encoding operation by allowing the image signal processor to determine, in accordance with the encoding speed, whether the inputted frame is to be encoded.

Other objects of the present invention will become apparent through the preferred embodiments described below.

To achieve the above objects, an aspect of the present invention features an image signal processor and/or an imaging device having the image signal processor.

According to an embodiment of the present invention, the image signal processor of the imaging device has an encoding unit, which generates encoded image data by encoding, in accordance with a predetermined encoding method, image data corresponding to an electrical signal inputted from an image sensor, and a data output unit, which temporarily stores the image data encoded by the encoding unit and transfers the stored encoded image data to a receiving part. The receiving part is a back-end chip or a baseband chip. The data output unit inputs a skip command, which makes the process of the following frame skip, to the image sensor or the encoding unit in case input start information of a following frame is inputted from the image sensor or the encoding unit while a preceding frame is processed by the encoding unit.

The predetermined encoding method can be one of a JPEG encoding method, a BMP encoding method, an MPEG encoding method, and a TV-out method.

The image signal processor can further comprise a clock generator.

The data output unit can output a clock signal to the receiving part in a section only to which valid data is delivered. Invalid data can be data including 0x00.

The data output unit can further output a vertical synchronous signal (V_sync) and a valid data enable signal to the receiving part.

The data output unit can comprise an AND gate, which stops the output of the clock signal inputted from a clock signal generator if a clock disable signal is inputted, a V_sync generator, which generates and outputs the vertical synchronous signal of high or low state in accordance with a vertical synchronous signal control command, an H_sync generator, which generates and outputs the valid data enable signal of high or low state in accordance with a valid data enable control command, a delay unit, which temporarily stores the encoded data and outputs in accordance with a data output control command the stored encoded data, and a transmission control unit, which generates and outputs the clock disable signal, the vertical synchronous signal control command, the valid data enable control command, and the data output control command. The transmission control unit can control the clock signal and the valid data enable signal to be outputted only in an output section of valid data of the encoded data, once encoded data is stored in the delay unit.

The valid data enable signal can be interpreted as a write enable signal in the receiving part.

The transmission control unit can determine, by using header information and tail information of the encoded image data stored in the delay unit, whether encoding of the preceding frame is completed.

In case input start information of the following frame is inputted while the preceding frame is being processed, the transmission control unit can control to maintain the current state if the vertical synchronous signal outputted by the V_sync generator is in a low state.

The image signal processor of the imaging device according to another embodiment of the present invention comprises a clock generator; an encoding unit, which generates encoded image data by encoding, in accordance with a predetermined encoding method, image data corresponding to an electrical signal inputted from an image sensor, an AND gate which stops the output of a clock signal inputted from the clock generator if a clock disable signal is inputted, a V_sync generator, which generates and outputs a vertical synchronous signal of high or low state in accordance with a vertical synchronous signal control command, an H_sync generator, which generates and outputs a valid data enable signal of high or low state in accordance with a valid data enable control command, a delay unit, which temporarily stores the encoded data and outputs in accordance with a data output control command the stored encoded data, and a transmission control unit, which generates and outputs the clock disable signal, the vertical synchronous signal control command, the valid data enable control command, and the data output control command. The clock signal, the vertical synchronous signal, the valid data enable signal, and the encoded data are outputted to a receiving part in accordance with a predetermined condition, and the transmission control unit inputs a skip command, which makes the process of the following frame skip, to the image sensor or the encoding unit in case input start information of a following frame is inputted from the image sensor or the encoding unit while a preceding frame is processed by the encoding unit. The receiving part is a back-end chip or a baseband chip.

According to another embodiment of the present invention, the image signal processor of the imaging device, comprising an image sensor, an image signal processor; a back-end chip, and a baseband chip, comprises an encoding unit, which generates encoded image data by encoding, in accordance with a predetermined encoding method, image data corresponding to an electrical signal inputted from the image sensor, and a data output unit, which temporarily stores the image data encoded by the encoding unit and transfers the stored encoded image data to a receiving part, which is a back-end chip or a baseband chip. The data output unit inputs a skip command, which makes the process of the following frame skip, to the image sensor or the encoding unit in case input start information of a following frame is inputted from the image sensor or the encoding unit while a preceding frame is processed by the encoding unit.

To achieve the above objects, another aspect of the present invention features a method of processing an image signal executed in the image signal processor and/or a recorded medium recording a program for executing the method thereof.

The method of processing the image signal executed in the image signal processor of an imaging device comprises generating encoded image data by encoding, in accordance with a predetermined encoding method, image data corresponding to an electrical signal inputted from an image sensor, storing the encoded image data, and outputting the stored encoded image data to a receiving part, which is a back-end chip or a baseband chip. In case input start information of a following frame is inputted from the image sensor while a preceding frame is processed, the process of the following frame is skipped.

The predetermined encoding method can be one of a JPEG encoding method, a BMP encoding method, an MPEG encoding method, and a TV-out method.

A valid data enable signal can be outputted to the receiving part in only an output section of valid data among the stored encoded data. Invalid data can be data including 0x00.

The valid data enable signal can be interpreted as a write enable signal in the receiving part.

Completion of encoding the preceding frame can be determined by using header information and tail information of the stored encoded image data.

DETAILED DESCRIPTION

Figure 1:
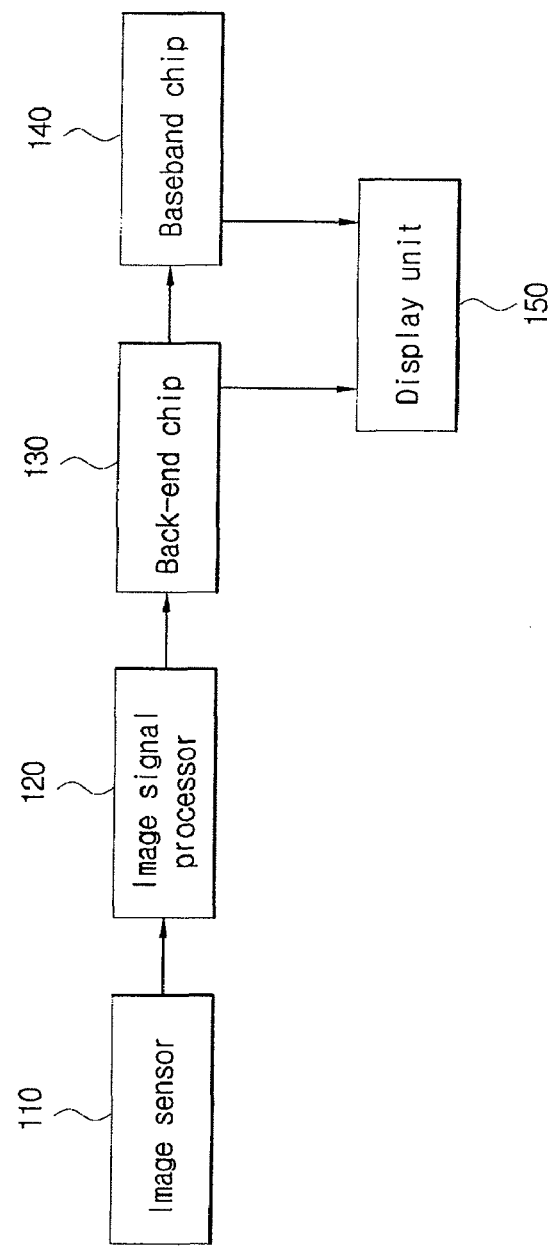
FIG. 1 shows a simple structure of a typical imaging device.
Figure 2:
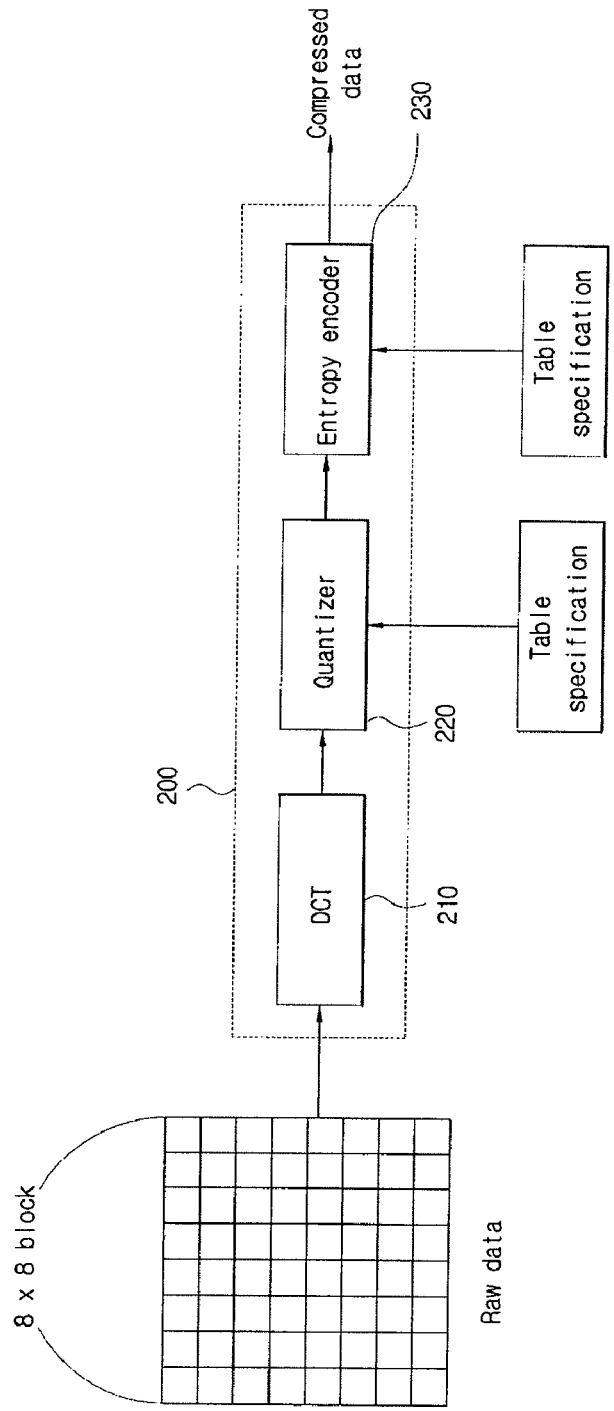
FIG. 2 shows the steps of typical JPEG encoding.
Figure 3:
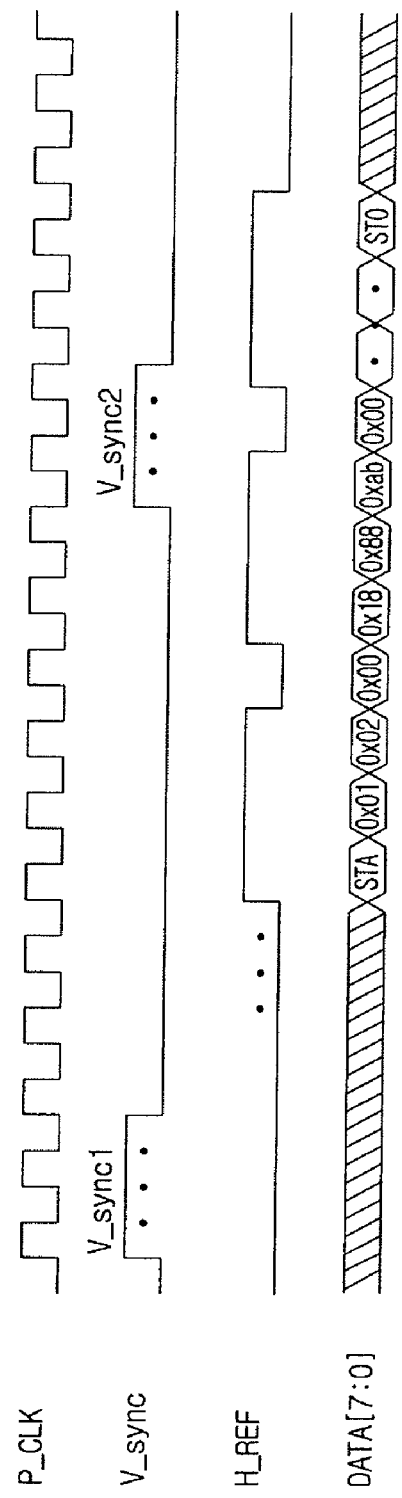
FIG. 3 shows signal types for which a conventional image signal processor outputs encoded data.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second">can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

In describing the embodiments of the present invention, the process operation of the image signal processor, which is the core subject of the invention, will be described. However, it shall be evident that the scope of the present invention is by no means restricted by what is described herein.

Figure 4:
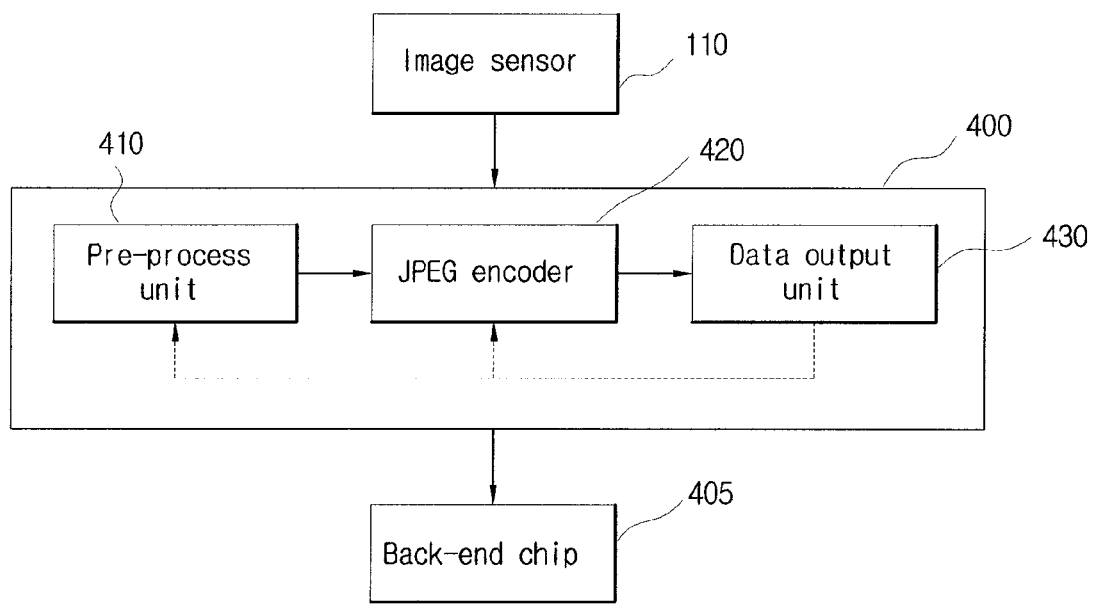
FIG. 4 shows the block diagram of an imaging device in accordance with an embodiment of the present invention.
Figure 5:
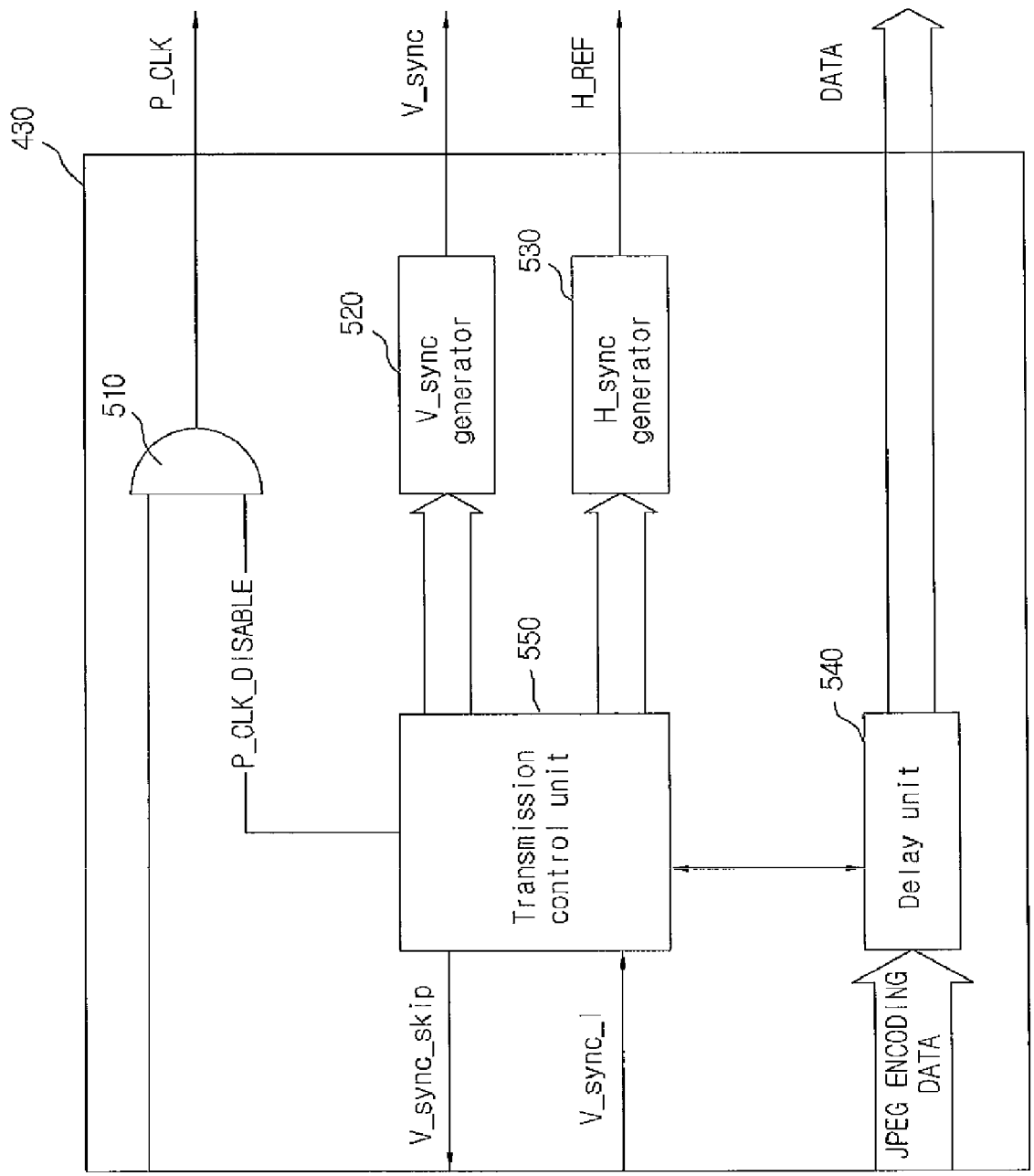
FIG. 5 shows the block diagram of a data output unit in accordance with an embodiment of the present invention.
Figure 6:
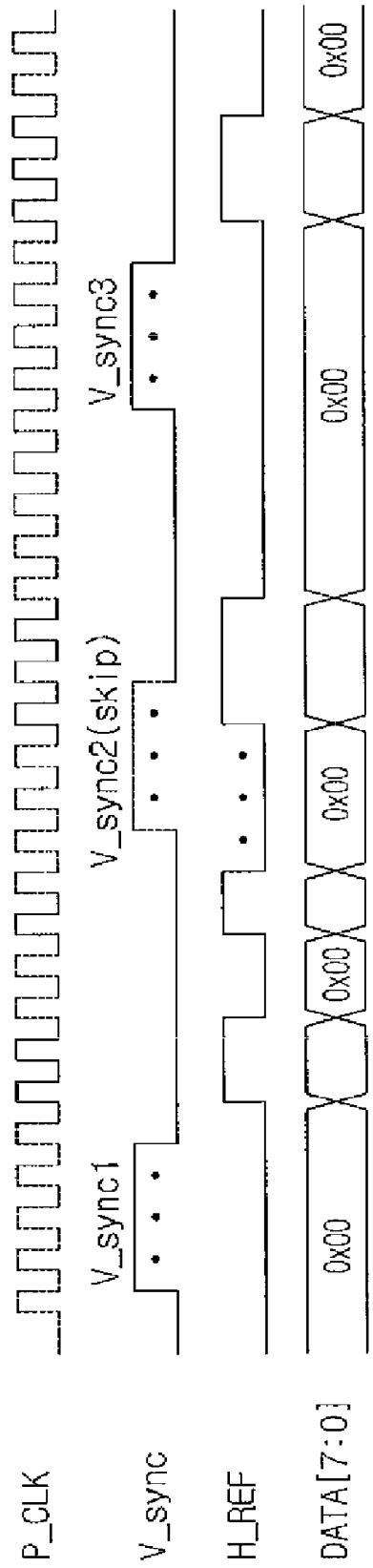
FIG. 6 shows signal types for which an image signal processor outputs encoded data in accordance with an embodiment of the present invention.

FIG. 4 shows the block diagram of an imaging device in accordance with an embodiment of the present invention; FIG. 5 shows the block diagram of a data output unit 430 in accordance with an embodiment of the present invention; and FIG. 6 shows signal types for which an image signal processor 120 outputs encoded data in accordance with an embodiment of the present invention.

As shown in FIG. 4, the imaging device of the present invention comprises an image sensor 110, an image signal processor 400 and a back-end chip 405. Although it is evident that the imaging device can further comprise a display unit 150, a memory, a baseband chip 140 and a key input unit, these elements are somewhat irrelevant to the present invention and hence will not be described herein.

The image signal processor 400 comprises a pre-process unit 410, a JPEG encoder 420 and a data output unit 430. The image signal processor 400 can of course further comprise a clock generator for internal operation.

The preprocess unit 410 performs pre-process steps in preparation for the process by the JPEG encoder 420. The pre-process unit 410 can receive from the image sensor 110 and process raw data for each frame per line, and then can transfer the raw data to the JPEG encoder 420.

The pre-process steps can comprise at least one of the steps consisting of color space transformation, filtering and color subsampling.

The color space transformation transforms an RGB color space to a YUV (or YIQ) color space. This is to reduce the amount of information without recognizing the difference in picture quality.

The filtering is a step of smoothing the image using a low-pass filter in order to increase the compression ratio.

The color subsampling subsamples the chrominance signal component by using all of the Y value, some of other values and none of the remaining values.

The JPEG encoder 420 compresses the pre-processed raw data, as in the method described earlier, and generates JPEG encoded data. The JPEG encoder 420 can comprise a memory for temporarily storing the processed raw data inputted from the pre-process unit 410 to divide the raw data into predetermined block units (e.g. 8×8) for encoding. In other words, the image signal processor 400 of the present invention can also encode image data, unlike the conventional image signal processor 120.

The data output unit 430 transfers the JPEG encoded data, generated by the JPEG encoder 420, to the back-end chip 420 (or a camera control processor).

If the V_sync_I signal, which notifies the input on the following frame is inputted from the image sensor 110 although the JPEG encoder 420 has not finished encoding a particular frame, the data output unit 430 controls a V_sync generator 520 (refer to FIG. 5) to have the output of the V_sync signal corresponding to the frame skip. The V_sync_I signal can function as, for example, input start information of a following frame.

By this, the V_sync generator 520 maintains the V_sync signal outputted to the back-end chip 405 in a low state (refer to V_sync2 illustrated with dotted lines in FIG. 6).

Of course, it is possible in this case that the data output unit 430 sends to the image sensor 110, the pre-process unit 410 or the JPEG encoder 420 a V_sync_skip signal for having the output and/or process skip on the following frame corresponding to the V_sync_I signal. For example, in case the image sensor 110 received the V_sync_skip signal, it is possible that the raw data of a frame corresponding to the V_sync_I signal is not sent to the pre-process unit 410. If the preprocess unit 410 received the V_sync_skip signal, it is possible that the process of the raw data of a frame corresponding to the V_sync_I signal is skipped or the processed raw data is not sent to the JPEG encoder 420. Likewise, if the JPEG encoder 420 received the V_sync_skip signal, it is possible that the processed raw data of a frame corresponding to the V_sync_I signal is not encoded or the processed raw data received from the pre-process unit 410 is not stored in the memory.

Through the above steps, although the raw data corresponding to a plurality of frames (referred to as #1, #2 and #3, in accordance with the order of input, herein for convenience) are sequentially inputted from the image sensor 110, the encoded image data inputted to the back-end chip 405 by the operation or control of the data output unit 430 can be restricted to frames corresponding to #1 and #3.

Here, the image sensor 110, the pre-process unit 410 or the JPEG encoder 420 must have been already realized to carry out a predetermined operation when the V_sync_skip signal is received from the data output unit 430. The method for designing and realizing the above elements shall be easily understood through the present description by anyone skilled in the art, and hence will not be further described.

If a command to, for example, capture a picture is received from the baseband chip 140, which controls the general operation of the portable terminal, the back-end chip 405 receives and stores in the memory the picture-improved JPEG encoded data, which is inputted from the image signal processor 400, and then has the baseband chip 140 read and process the data.

The detailed structure of the data output unit 430 is illustrated in FIG. 5.

Referring to FIG. 5, the data output unit 430 comprises an AND gate 510, the V_sync generator 520, an H_sync generator 530, the delay unit 540 and a transmission control unit 550.

The AND gate 510 outputs a clock signal (P_CLK) to the back-end chip 405 only if every input is inputted with a signal. That is, by receiving the clock signal from a clock generator (not shown), disposed in the image signal processor 400, and receiving a clock control signal from the transmission control unit 550, the AND gate 510 outputs the clock signal to the back-end chip 405 only when the clock control signal instructs the output of the clock signal. The clock control signal can be a high signal or a low signal, each of which can be recognized as a P_CLK enable signal or a P_CLK disable signal.

The V_sync generator 520 generates and outputs the vertical synchronous signal (V_sync) for displaying a valid section, by the control of the transmission control unit 550. The V_sync generator 520 outputs a high state of V_sync signal until an output termination command of the V_sync signal is inputted by the transmission control unit 550 after an output command of the V_sync signal is inputted. It shall be evident to anyone skilled in the art that the vertical synchronous signal means the start of input of each frame.

The H_sync generator 530 generates and outputs a valid data enable signal (H_REF) by the control of the transmission control unit 550 (i.e. until an output termination command of H_REF is inputted after an output command of H_REF is inputted). The high section of the valid data enable signal coincides with the output section in which the JPEG encoded data on one frame is outputted from the delay unit 540.

The delay unit 540 receives and temporarily stores the JPEG data encoded by the JPEG encoder 420, and transfers the JPEG encoded data to the back-end chip 405 by the control of the transmission control unit 440. The delay unit 540 can delay the encoded image data inputted from the JPEG encoder 420 for a brief period (e.g. while the transmission control unit 550 is controlling each element) to transmit the encoded image data sequentially to the back-end chip 405 sequentially, or can transmit the encoded image data to the back-end chip 405 in predetermined units (e.g. process block units or frame units for encoding). The delay unit 540 can comprise, for example, a register for delaying the data inputted from the JPEG encoder 420 for predetermined duration (e.g. 2-3 clocks) before outputting the data.

In case the JPEG encoder 420 includes an output memory for outputting encoded image data, the delay unit 540 can receive the encoded data from the output memory. By storing the JPEG encoded data in the memory, the back-end chip 405 allows the baseband chip 140 to use the data as necessary.

The transmission control unit 550 controls the output of the clock control signal, the V_sync generator 520, the H_sync generator 530 and the delay unit 540 to control the output state of each signal (i.e. P_CLK, H_sync, V_sync and data).

The transmission control unit 550 can recognize the information on the start and end of JPEG encoding by capturing "START MARKER" and "STOP MARKER" from the JPEG header and tail of the data stored in the delay unit 540. Through this, it becomes possible to recognize whether one frame is completely encoded by the JPEG encoder 420.

If the V_sync_I signal is inputted from the image sensor 110 although the JPEG encoding is not completed, the transmission control unit 550 controls the V_sync generator 520 to have the output of the V_sync signal skip, as described earlier. In other words, if the V_sync generator 520 is outputting the low state of V_sync signal to the back-end chip 405, the transmission control unit 550 will control to maintain the current state.

Then, as described earlier in detail, the transmission control unit 550 can control the following frame corresponding to the V_sync_skip signal to skip the output and process (e.g. JPEG encoding) of data by transmitting the V_sync_skip signal to the image sensor 110, the pre-process unit 410 or the JPEG encoder 420.

This is because the following element does not have to carry out any unnecessary process if data corresponding to the V_sync_I signal is not inputted from the preceding element (e.g. the image sensor 110 that received the V_sync_skip signal does not output raw data corresponding to the V_sync_I signal), or the following element can delete the inputted data (e.g. the JPEG encoder 420 that received the V_sync_skip signal does not encode but delete the processed raw data received from the pre-process unit 410 in accordance with the V_sync_I signal). Using this method, each element of the image signal processor 400 carries out its predetermined function but does not process the following frame unnecessarily, reducing unnecessary power consumption and limiting the reduction in process efficiency.

The signal types inputted to the back-end chip 405 by the control of the transmission control unit 550 are shown in FIG. 6.

As shown in FIG. 6, while invalid encoded data (0x00) is being outputted, the clock signal (P_CLK) to be outputted to the back-end chip 405 is turned off (the dotted sections of P_CLK in FIG. 6), and hence any unnecessary operation can be minimized, minimizing the power consumption of the back-end chip 405. Of course, the type of invalid data (i.e. data that is not substantially forming an image) referred to in the JPEG standard is not restricted to 0x00, which is only used as an example of invalid data in this description.

Moreover, if the speed at which the JPEG encoder 420 encodes one frame (e.g. $n^{th}$ frame, whereas n is a natural number), inputted from the image sensor 110, is slow (e.g. V_sync_I, indicating the start of input of a new frame, is inputted while encoding one frame), the data output unit 430 allows the JPEG encoding to be completed by having the V_sync signal for the following frame to be maintained low (i.e. the dotted sections of V_sync, shown in FIG. 6; the V_sync2 signal, which would be outputted at the corresponding point in the related art, is skipped in the present invention), as shown in FIG. 6, since the following frame (e.g. the $(n+1)^{th}$ inputted frame) can not be simultaneously encoded (e.g. data error will occur if these frames are encoded simultaneously). By the control of the data output unit 430, the JPEG encoder 420 skips the encoding of the next frame. In case the transmission control unit 550 transmitted the V_sync_skip signal to the image sensor 110 or the pre-process unit 410, the JPEG encoder 420 may not be provided with data corresponding to V_sync_I from the preceding element.

The conventional back-end chip 405 is embodied to receive the YUV/Bayer format of data, and uses the P_CLK, V_sync, H_REF and DATA signals as the interface for receiving these data.

Considering this, the image signal processor 400 of the present invention is embodied to use the same interface as the conventional image signal processor.

Therefore, it shall be evident that the back-end chip 405 of the present invention can be port-matched although the back-end chip 405 is embodied through the conventional method of designing back-end chip.

For example, if the operation of a typical back-end chip 405 can be said to be initialized from an interrupt of the rising edge of the V_sync signal, the interfacing between the chips is possible, similar to outputting the conventional V_sync signal, in the present invention by inputting the corresponding signal to the back-end chip 405, since the conventional interface structure is identically applied to the present invention.

Likewise, considering that the typical back-end chip 405 must generate the V_sync rising interrupt and that the valid data enable signal (H_REF) is used as a write enable signal of the memory when data is received from the image signal processor 400, the power consumption of the back-end chip 405 can be reduced by using the signal output method of the present invention.

Hitherto, although the image signal processor 400 using the JPEG encoding method has been described, it shall be evident that the same data transmission method can be used for other encoding methods, such as the BMP encoding method, MPEG (MPEG 1/2/4 and MPEG-4 AVC) encoding and TV-out method.

As described above, the present invention can increase the process efficiency and reduce power consumption of the back-end chip.

Moreover, the present invention can make the hardware design and control easier by using a general interface structure when the image signal processor provides encoded data to the back-end chip.

Furthermore, the present invention enables a smooth encoding operation by allowing the image signal processor to determine, in accordance with the encoding speed, whether the inputted frame is to be encoded.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. An image signal processor of an imaging device, the image signal processor comprising:
    an encoding unit, generating encoded image data by encoding, in accordance with a predetermined encoding method, image data corresponding to an electrical signal inputted from an image sensor; and
    a data output unit, temporarily storing the image data encoded by the encoding unit and transferring the stored encoded image data to a receiving part,
    whereas the data output unit inputs a skip command to the image sensor or the encoding unit in case input start information of a following frame is inputted from the image sensor or the encoding unit while a preceding frame is processed by the encoding unit, the skip command making the process of the following frame skip, and
    the data output unit outputs a clock signal to the receiving part in a section only to which valid data is delivered.

2. The image signal processor of claim 1, wherein the predetermined encoding method is one of a JPEG encoding method, a BMP encoding method, an MPEG encoding method, and a TV-out method.

3. The image signal processor of claim 1, further comprising a clock generator.

4. The image signal processor of claim 1, wherein the data output unit further outputs a vertical synchronous signal (V_sync) and a valid data enable signal to the receiving part.

5. The image signal processor of claim 4, wherein the data output unit comprises:
    an AND gate, stopping the output of the clock signal inputted from a clock signal generator if a clock disable signal is inputted;
    a V_sync generator, generating and outputting the vertical synchronous signal of high or low state in accordance with a vertical synchronous signal control command;
    an H_sync generator, generating and outputting the valid data enable signal of high or low state in accordance with a valid data enable control command;
    a delay unit, temporarily storing the encoded data and outputting in accordance with a data output control command the stored encoded data; and a transmission control unit, generating and outputting the clock disable signal, the vertical synchronous signal control command, the valid data enable control command, and the data output control command, whereas the transmission control unit controls the clock signal and the valid data enable signal to be outputted only in an output section of valid data of the encoded data, once encoded data is stored in the delay unit.

6. The image signal processor of claim 5, wherein the valid data enable signal is interpreted as a write enable signal in the receiving part.

7. The image signal processor of claim 5, wherein the transmission control unit determines, by using header information and tail information of the encoded image data stored in the delay unit, whether encoding of the preceding frame is completed.

8. The image signal processor of claim 7, wherein, in case input start information of the following frame is inputted while the preceding frame is being processed, the transmission control unit controls to maintain the current state if the vertical synchronous signal outputted by the V_sync generator is in a low state.

9. An image signal processor of an imaging device, the image signal processor comprising:

a clock generator;

an encoding unit, generating encoded image data by encoding, in accordance with a predetermined encoding method, image data corresponding to an electrical signal inputted from an image sensor;

an AND gate, stopping the output of a clock signal inputted from the clock generator if a clock disable signal is inputted;

a V_sync generator, generating and outputting a vertical synchronous signal of high or low state in accordance with a vertical synchronous signal control command;

an H_sync generator, generating and outputting a valid data enable signal of high or low state in accordance with a valid data enable control command;

a delay unit, temporarily storing the encoded data and outputting in accordance with a data output control command the stored encoded data; and a transmission control unit, generating and outputting the clock disable signal, the vertical synchronous signal control command, the valid data enable control command, and the data output control command, whereas the clock signal, the vertical synchronous signal, the valid data enable signal, and the encoded data are outputted to a receiving part in accordance with a predetermined condition, and the transmission control unit inputs a skip command to the image sensor or the encoding unit in case input start information of a following frame is inputted from the image sensor or the encoding unit while a preceding frame is processed by the encoding unit, the skip command making the process of the following frame skip.

10. The image signal processor of claim 9, wherein valid encoded data is outputted in a section only in which the valid data enable signal is high.

11. An imaging device, comprising an image sensor, an image signal processor, a back-end chip, and a baseband chip, wherein the image signal processor comprises:

an encoding unit, generating encoded image data by encoding, in accordance with a predetermined encoding method, image data corresponding to an electrical signal inputted from the image sensor; and a data output unit, temporarily storing the image data encoded by the encoding unit and transferring the stored encoded image data to a receiving part, whereas the data output unit inputs a skip command to the image sensor or the encoding unit in case input start information of a following frame is inputted from the image sensor or the encoding unit while a preceding frame is processed by the encoding unit, the skip command making the process of the following frame skip, and the data output unit outputs a clock signal to the receiving part in a section only to which valid data is delivered.

12. A method of processing an image signal, the method executed in an image signal processor of an imaging device, the method comprising:

generating encoded image data by encoding, in accordance with a predetermined encoding method, image data corresponding to an electrical signal inputted from an image sensor;

storing the encoded image data; and outputting the stored encoded image data to a receiving part, whereas, in case input start information of a following frame is inputted from the image sensor while a preceding frame is processed, the process of the following frame is skipped, and a valid data enable signal is outputted to the receiving part in only an output section of valid data among the stored encoded data.

13. The method of claim 12, wherein the predetermined encoding method is one of a JPEG encoding method, a BMP encoding method, an MPEG encoding method, and a TV-out method.

14. The method of claim 12, wherein the valid data enable signal is interpreted as a write enable signal in the receiving part.

15. The method of claim 12, wherein completion of encoding the preceding frame is determined by using header information and tail information of the stored encoded image data.

* * * * *